United States Patent
Johnson

(10) Patent No.: US 7,448,199 B2
(45) Date of Patent: Nov. 11, 2008

(54) SELF POWDERED MISSILE TURBOJET

(75) Inventor: James Edward Johnson, Hamilton, OH (US)

(73) Assignee: General Electric Company, Schenectady, NY (US)

(*) Notice: Subject to any disclaimer, the term of this patent is extended or adjusted under 35 U.S.C. 154(b) by 211 days.

(21) Appl. No.: 11/118,966

(22) Filed: Apr. 29, 2005

(65) Prior Publication Data

US 2006/0242962 A1 Nov. 2, 2006

(51) Int. Cl.
*F02K 3/02* (2006.01)
(52) U.S. Cl. .............. 60/226.1; 239/265.17; 244/53 R
(58) Field of Classification Search ............. 60/226.1, 60/761–766, 262, 770, 771, 39.281, 233, 60/228; 239/265.17; 244/53 R, 56, 3.22
See application file for complete search history.

(56) References Cited

U.S. PATENT DOCUMENTS

| | | | |
|---|---|---|---|
| 2,846,843 A | 8/1958 | Clark et al. | |
| 3,296,804 A | 1/1967 | Keenan et al. | |
| 3,382,670 A | 5/1968 | Venable | |
| 3,420,060 A | 1/1969 | Ostroff et al. | |
| 3,677,012 A | 7/1972 | Batscha | |
| 3,729,957 A | 5/1973 | Petrie et al. | |
| 3,779,007 A * | 12/1973 | Lavash | 60/39.281 |
| 3,826,586 A * | 7/1974 | Richards | 415/42 |
| 3,830,056 A | 8/1974 | Willis et al. | |
| 3,834,160 A * | 9/1974 | Moehring et al. | 60/243 |
| 3,938,328 A | 2/1976 | Klees | |
| 4,038,817 A * | 8/1977 | Snow et al. | 60/204 |
| 4,043,121 A | 8/1977 | Thomas et al. | |
| 4,052,847 A | 10/1977 | Rodgers et al. | |
| 4,054,030 A | 10/1977 | Pedersen | |
| 4,055,042 A | 10/1977 | Colley | |
| 4,060,981 A | 12/1977 | Hampton | |
| 4,064,692 A | 12/1977 | Johnson et al. | |
| 4,068,471 A | 1/1978 | Simmons | |
| 4,069,661 A * | 1/1978 | Rundell et al. | 60/204 |
| 4,072,008 A | 2/1978 | Kenworthy et al. | |
| 4,080,785 A * | 3/1978 | Koff et al. | 60/226.3 |
| 4,095,420 A * | 6/1978 | Abernethy et al. | 60/204 |

(Continued)

FOREIGN PATENT DOCUMENTS

GB 757818 A 9/1956

(Continued)

OTHER PUBLICATIONS

GE Aircraft Engines, "J93 Engine Cross Section," publicly available more than one year before Mar. 1, 2005, singe page.

(Continued)

*Primary Examiner*—William H Rodriguez
(74) *Attorney, Agent, or Firm*—William S. Andes; Francis L. Conte

(57) ABSTRACT

A turbojet engine includes a core engine, an afterburner, and a converging-diverging exhaust nozzle in serial flow communication. An integral starter-generator is disposed inside the core engine and is joined to the rotor for equal speed rotation therewith. An electrical controller coordinates operation of the engine for subsonic, transonic, and supersonic operation of the engine in a missile self-powered by the starter-generator.

22 Claims, 4 Drawing Sheets

U.S. PATENT DOCUMENTS

| | | | | |
|---|---|---|---|---|
| 4,175,384 | A | * | 11/1979 | Wagenknecht et al. ...... 60/226.3 |
| 4,176,792 | A | | 12/1979 | McCardle, Jr. |
| 4,435,958 | A | * | 3/1984 | Klees ........................... 60/204 |
| 4,551,971 | A | | 11/1985 | Suzuki |
| 4,958,489 | A | | 9/1990 | Simmons |
| 5,349,814 | A | | 9/1994 | Ciokajlo et al. |
| 5,402,638 | A | | 4/1995 | Johnson |
| 5,404,713 | A | * | 4/1995 | Johnson ........................ 60/204 |
| 5,435,127 | A | * | 7/1995 | Luffy et al. .................... 60/204 |
| 5,806,303 | A | * | 9/1998 | Johnson ........................ 60/262 |
| 5,809,772 | A | * | 9/1998 | Giffin et al. ................. 60/226.1 |
| 5,996,936 | A | * | 12/1999 | Mueller ..................... 244/53 R |
| 6,112,513 | A | * | 9/2000 | Catt et al. ...................... 60/204 |
| 6,336,319 | B1 | | 1/2002 | Koshoffer |
| 6,467,725 | B1 | | 10/2002 | Coles et al. |
| 6,487,847 | B1 | * | 12/2002 | Snow et al. ................... 60/235 |
| 6,895,741 | B2 | | 5/2005 | Rago et al. ................. 60/226.1 |
| 7,013,636 | B2 | * | 3/2006 | Iya et al. ....................... 60/204 |
| 7,185,485 | B2 | * | 3/2007 | Lewis ........................... 60/243 |
| 7,216,475 | B2 | * | 5/2007 | Johnson ..................... 60/226.1 |
| 2003/0074884 | A1 | * | 4/2003 | Snow et al. ................... 60/204 |
| 2003/0145577 | A1 | | 8/2003 | Hunter et al. |
| 2005/0081509 | A1 | | 4/2005 | Johnson |
| 2005/0284150 | A1 | | 12/2005 | Dittmar et al. |
| 2006/0042252 | A1 | * | 3/2006 | Derouineau ................. 60/703 |
| 2007/0044476 | A1 | * | 3/2007 | Koshoffer .................... 60/776 |

FOREIGN PATENT DOCUMENTS

| | | |
|---|---|---|
| GB | 822299 A | 10/1959 |
| GB | 827744 A | 2/1960 |
| GB | 921727 A | 3/1963 |
| GB | 1069872 A | 5/1967 |
| GB | 1273017 A | 5/1972 |
| GB | 1452267 A | 10/1976 |
| GB | 2054745 A | 2/1981 |
| WO | WO 2004/022948 A1 | 3/2004 |

OTHER PUBLICATIONS

Janes, "USA: Engines," Jane's All the World's Aircraft, 1986, pp. cover, 958, 959, 962, & 963.

www.fiddlergreen.net, "Raytheon Tomahawk B6M-109 Cruise Missile," Mar. 1, 2005, 5 pages.

www.labiker.org, "001- Flight of the Valkyrie," Mar. 15, 2005, 17 pages, printed article only.

Johnson, U.S. Appl. No. , concurrently filed Apr. 29, 2005, "Fladed Supersonic Missile Turbojet,".

Johnson, U.S. Appl. No. , concurrently filed Apr. 29, 2005, "Supersonic Missile Turbojet Engine,".

Johnson, U.S. Appl. No. , concurrently filed Apr. 29, 2005, "Thrust Vectoring Missile Turbojet,".

Johnson, U.S. Appl. No. 11/118,698, concurrently filed Apr. 29, 2005, "Fladed Supersonic Missile Turbojet,".

Johnson, U.S. Appl. No. 11/118,967, concurrently filed Apr. 29, 2005, "Supersonic Missile Turbojet Engine,".

Johnson, U.S. Appl. No. 11/118,171, concurrently filed Apr. 29, 2005, "Thrust Vectoring Missile Turbojet,".

* cited by examiner

SELF POWDERED MISSILE TURBOJET

BACKGROUND OF THE INVENTION

The present invention relates generally to gas turbine engines, and, more specifically, to supersonic missile engines.

Typical commercial and military aircraft are powered by multi-rotor turbofan gas turbine engines. A forward fan is powered by a low pressure turbine (LPT). A multistage axial compressor follows the fan and is powered by a multistage high pressure turbine (HPT).

An annular combustor is located between the compressor and the HPT for mixing fuel with the pressurized air and generating hot combustion gases from which energy is extracted by the HPT and LPT during operation. The rotor blades of the two turbines are joined to corresponding rotor shafts or spools to the rotor blades of the fan and the compressor.

The turbofan engine is sized for producing near maximum propulsion thrust during takeoff operation of the aircraft being powered thereby during which maximum airflow or mass flow is achieved in the engine at a correspondingly high rotor speed of the HPT and compressor, and a lower speed for the LPT and fan.

In order to provide additional propulsion thrust for military aircraft, and typically for supersonic operation thereof, an augmentor or afterburner may be introduced following the turbofan core engine. The typical afterburner includes an annular combustion liner, with a plurality of fuel spray bars and V-gutter flameholders at the forward end thereof. An articulated converging-diverging (CD) nozzle is disposed at the aft end of the afterburner for discharging the combustion exhaust gases during operation.

The CD exhaust nozzle is typically formed of a row of primary exhaust flaps which converge in the downstream direction to a throat of minimum flow area from which a row of secondary exhaust flaps diverge to the nozzle outlet for providing controlled diffusion of the exhaust flow being discharged. A suitable drive train, including one or more actuators and linkages, controls the kinematic motion of the exhaust flaps in accordance with predetermined schedules for the converging and diverging slopes of the flaps and the flow area at the throat therebetween.

During subsonic operation of the aircraft below Mach 1 when the afterburner is operated dry without fuel flow through the spray bars thereof, the nozzle throat has a minimum flow area for maximizing performance of the core engine.

During wet operation of the afterburner when fuel flow is scheduled through the spray bars, the fuel is mixed with the spent combustion gases from the core engine and ignited to re-energize the combustion gases and provide additional propulsion thrust from the engine.

Full-time operation of the afterburner permits transonic and supersonic operation of the aircraft above Mach 1 which requires the increased propulsion thrust from the engine. And during wet operation, the CD nozzle is scheduled to increase the flow area of the throat for accommodating the increased mass flow of the combustion gases discharged therethrough for maintaining efficiency and performance of the engine during supersonic flight.

Whereas gas turbine engines specifically configured for powering aircraft in flight are relatively complex for the required safety of operation for carrying people in flight over an extended number of flight cycles, gas turbine engines for missile applications may be considerably simpler in configuration, and smaller in size, and specifically configured for single flight applications for reaching the intended military target, without the need to carry people.

Various forms of turbojet and turbofan gas turbine engines are known for powering military missiles typically at subsonic flight speeds. The engines are configured as simply as possible and as small as possible for producing the required propulsion thrust for the intended flight range.

Air breathing missiles, like their counterpart manned aircraft, require a suitable inlet for channeling ambient air to the engine. The engine includes a suitable compressor for pressurizing the air which is then mixed with fuel in a combustor for generating hot combustion gases. Energy is extracted from the combustion gases in variously configured turbines for producing propulsion thrust to power the missile.

Since currently known missiles have subsonic flight limits, afterburners and the associated increase in size and complexity are avoided in such missiles.

However, supersonic flight, air breathing missile systems can provide corresponding advantages for military applications and are the next progression in the development of missile systems. In particular, air breathing missile systems in the Mach 3.0-3.5 class require substantial propulsion thrust capability from subsonic, through transonic, and to the maximum supersonic flight speeds required. Since weight is a paramount design objective for all flying systems, supersonic missiles should maximize payload capability while minimizing missile size, weight, and cost, which are competing objectives.

The gas turbine engine designed for a supersonic missile system fundamentally affects the entire configuration of the missile and its payload capability and flight range. A suitable engine should have minimum engine size and provide balanced thrust production at key transonic and supersonic flight conditions.

The engine design should simplify the design requirements of the Mach 3.0-3.5 class air inlet for the missile. Correspondingly, the engine design should simplify the exhaust system for the Mach 3.0-3.5 missile.

The engine design should address the mitigation of air vehicle, or missile, and engine installation losses. The installed engine may further include thrust vectoring capabilities but should be integrated in an efficient manner.

Since the engine must produce electrical power in addition to propulsion thrust during operation, the engine design as integrated in the missile should also include improved power generation and power supply capabilities therein. The typical engine control and accessories should be minimized in size and packaging for effecting a compact missile system.

Since the engine generates considerable heat during operation, and the missile will fly at substantially maximum flight speed over its intended flight range, critical thermal management issues must also be addressed in the engine design for achieving reliable operation of the missile to its intended target.

And, the many and varied competing design factors in a supersonic class air breathing missile must also be addressed for providing minimum weight of the missile and engine system, minimum size, maximum performance and reliability, all with the minimum cost of production specific to the propulsion engine itself.

Accordingly, it is desired to provide an improved gas turbine engine for a supersonic missile application.

BRIEF DESCRIPTION OF THE INVENTION

A turbojet engine includes a core engine, an afterburner, and a converging-diverging exhaust nozzle in serial flow communication. An integral starter-generator is disposed inside the core engine and is joined to the rotor for equal speed rotation therewith. An electrical controller coordinates operation of the engine for subsonic, transonic, and supersonic operation of the engine in a missile self-powered by the starter-generator.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
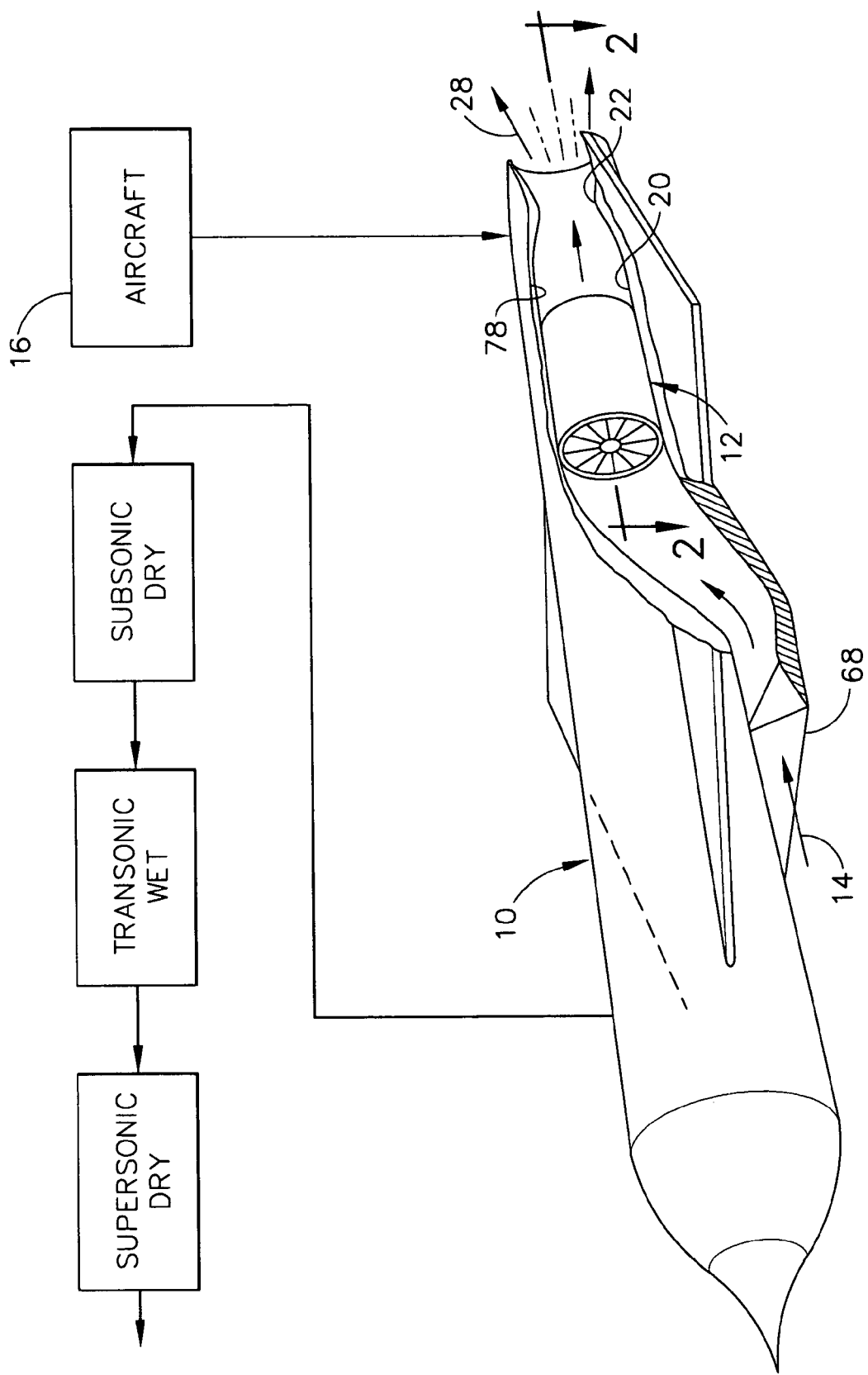
FIG. 1 is a partly schematic isometric view of an exemplary supersonic missile powered by a turbojet gas turbine engine.

Illustrated in FIG. 1 is an exemplary supersonic missile 10 powered by a turbojet gas turbine engine 12 suitably mounted inside the aft end thereof. The missile 10 itself may have any suitable configuration and size for flight operation from subsonic, through transonic, and into supersonic flight speeds in the class of Mach 3.0-3.5.

The missile is air breathing and ingests ambient ram air 14 during operation which is compressed inside the turbojet engine 12 for producing all of the propulsion thrust required for subsonic through supersonic operation of the missile.

In a typical application, the missile 10 is sized and configured for being carried to high altitude by a corresponding military aircraft 16 which will launch the missile at altitude for subsequent travel to the intended target. The missile is released from the aircraft and powered by the turbojet engine which is operated in turn for accelerating the missile from subsonic speed when released from the aircraft, through transonic speed and into the intended supersonic Mach 3.0-3.5 maximum speed thereof.

Figure 2:
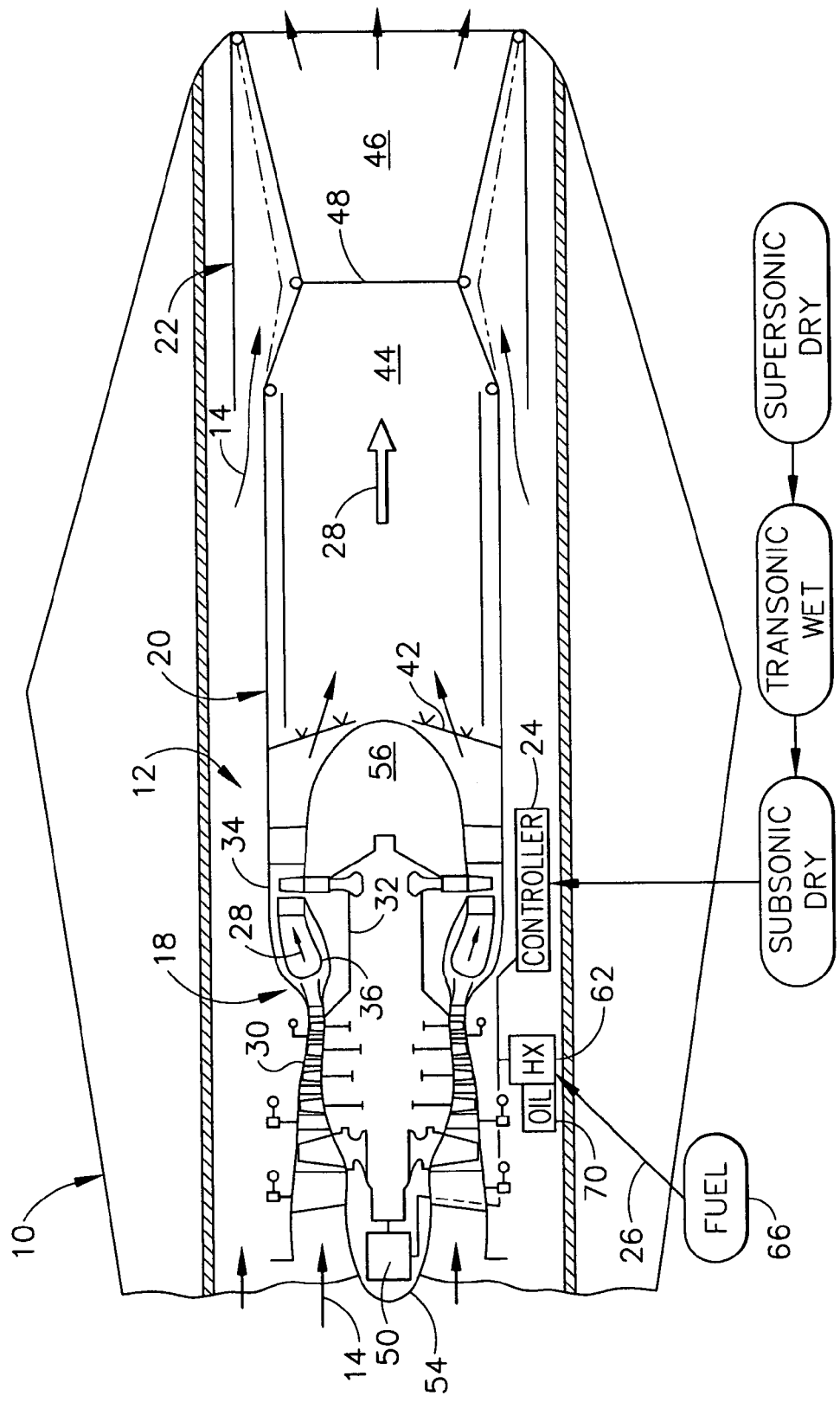
FIG. 2 is an enlarged axial sectional view of the turbojet engine illustrated in FIG. 1 and taken along line 2-2.

The turbojet engine 12 is illustrated in more detail in FIG. 2 and includes a core engine 18, an augmentor or afterburner 20, and a converging-diverging (CD) exhaust nozzle 22 disposed in serial flow communication coaxially along a longitudinal or axial centerline axis extending longitudinally through the engine and surrounding missile.

The engine also includes a suitable electrical controller 24, such as a conventional digitally programmable computer, which is operatively joined to the core engine 18, afterburner 20, and exhaust nozzle 22 for controlling and coordinating operation thereof. The controller is suitably configured, in software for example, for scheduling fuel 26 to the core engine and afterburner which is mixed with the incoming air 14 for generating hot combustion gases 28 during operation.

In particular, the controller 24 provides means for scheduling fuel to the afterburner in a predetermined schedule for operating the afterburner dry without additional fuel injected therein during subsonic flight of the engine and missile, operating the afterburner wet with additional fuel injected therein during transonic flight operation of the missile, and again operating the afterburner dry without additional fuel injected therein during supersonic flight of the missile in turn as the engine accelerates the missile in speed from its initial subsonic speed below Mach 1 to the intended maximum supersonic speed, such as the Mach 3.0 to 3.5 maximum flight speed desired.

The controller therefore has the technical effect of operating the engine components to achieve the necessary propulsion thrust for subsonic, transonic, and supersonic flight operation of the missile powered by the engine.

For transonic flight operation between subsonic and supersonic flight speeds, the afterburner is operated wet with additional fuel being injected therein for re-energizing the combustion gases and providing the additional propulsion thrust for powering the missile through the portion of the flight envelope in which the sound barrier is broken. The afterburner should be operated wet only as required for the specific missile propulsion requirements of the flight envelope to minimize fuel consumption.

For example, transonic wet operation may occur in the exemplary range of Mach 0.8 to about Mach 2.0. Above Mach 2.0 operation, the afterburner is operated dry to conserve fuel and maximize missile flight range. And, if required, the afterburner may again be operated wet, for example greater than about Mach 3.0, to meet the higher propulsion thrust requirements of the missile in this portion of the flight envelope.

The core engine 18 is illustrated in FIG. 2 and includes a multistage axial compressor 30 which pressurizes the ram air 14 received from outside the missile. The compressor 30 is joined by a shaft or rotor 32 to a single-stage high pressure turbine (HPT) 34 disposed downstream therefrom. The HPT includes a stator nozzle and a row of turbine rotor blades which power the rotor 32.

An annular combustor 36 is disposed between the compressor and HPT and receives the pressurized air from the compressor which is then mixed with fuel in the combustor for generating the hot combustion gases 28 that are discharged through the turbine which extracts energy therefrom to in turn power the compressor.

Figure 3:
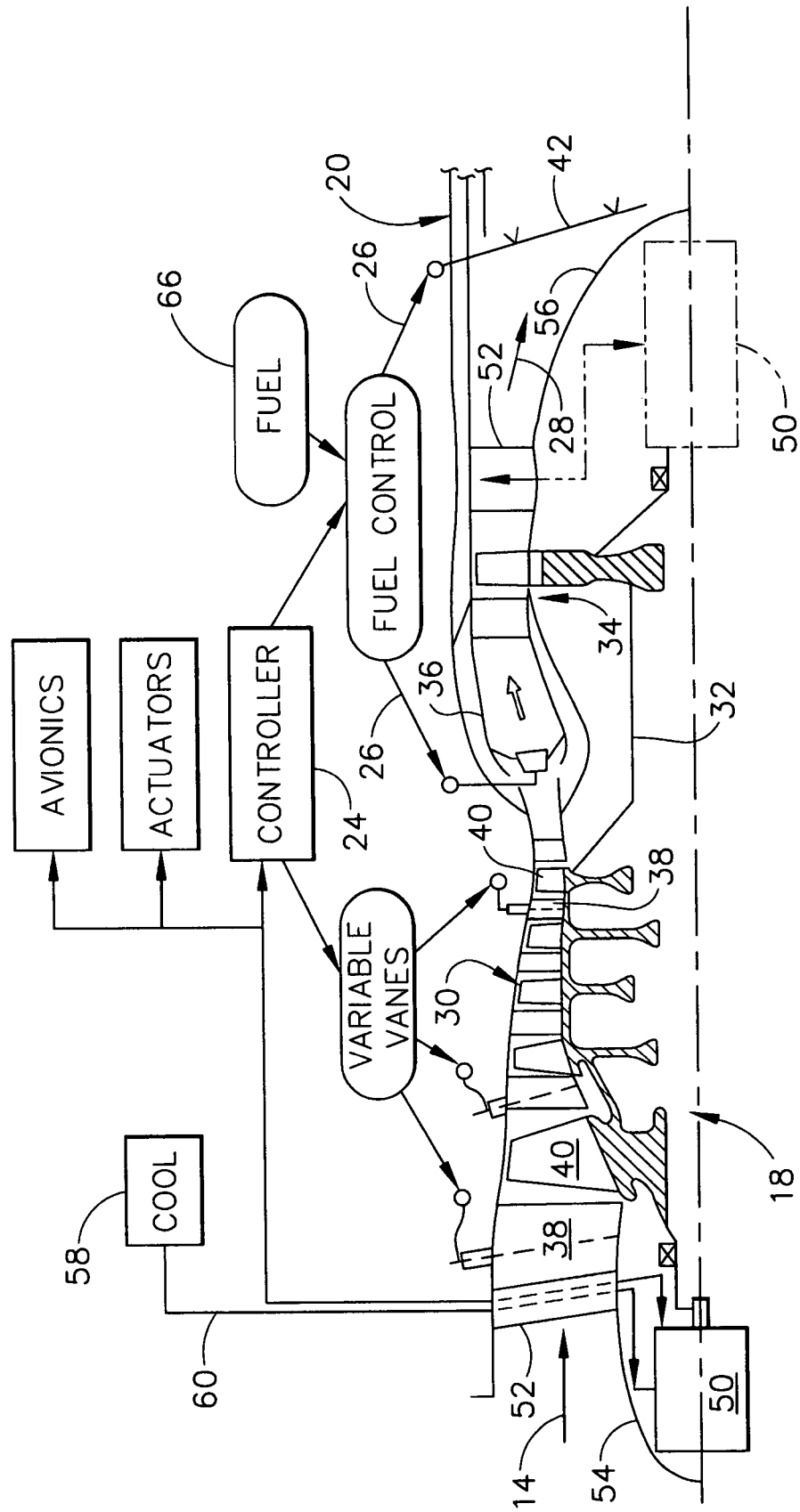
FIG. 3 is an enlarged axial sectional view of the core engine illustrated in FIG. 2.

As shown in FIG. 3, an exemplary configuration of the compressor 30 includes sequential stages or rows of cooperating stator vanes 38 extending radially inwardly from a supporting stator casing, and corresponding rows of rotor or compressor blades 40 extending radially outwardly from corresponding supporting disks joined to the rotor 32. The first two and last stages of the compressor vanes 38 are variable, with each variable vane being rotatable around a radial axis thereof for varying the flow area and direction of the intervane flow passages during operation. Each row of variable vanes 38 includes a conventional drive train for simultaneously rotating each of the vanes in unison.

Variable stator vanes in axial compressors are conventionally known along with their corresponding actuation or drive trains which include corresponding levers, unison rings, and actuators for adjusting the rotary position of the vanes in each row. The corresponding drive trains for the variable vanes are in turn operatively joined to the engine controller 24 which controls the precise rotary position of the various variable vane stages for maintaining suitable stall margin of the compressor during the entire flight envelope as well as maximizing efficiency of the compressor.

Conventional axial compressors in modern turbojet or turbofan aircraft engines typically include multiple stages of variable stator vanes at the forward end of the compressor with the last several stages of stator vanes being fixed, and not variable. In contrast, the turbojet engine illustrated in FIG. 2 additionally introduces variable stator rear vanes 38 in the last compressor stage for effecting different positions corresponding with subsonic dry operation and supersonic dry operation in particular.

All of the variable stator vanes in the compressor are suitably scheduled for corresponding rotary positions thereof for maintaining adequate stall margin of the compressor during the entire flight envelope of the missile.

However, the rotary position of the last stage compressor vanes is suitably scheduled in the controller 24 to limit the physical rotational speed of the rotor 32 during dry supersonic flight requiring maximum airflow through the compressor, with that rotor speed being limited to about the physical rotary speed of the rotor 32 during dry subsonic flight requiring correspondingly less airflow through the compressor.

The single-rotor afterburning turbojet engine illustrated in FIG. 2 provides substantial benefits for the Mach 3.0-3.5 class air breathing missile. Balanced thrust production can be achieved by incorporating the afterburner 20 for transonic propulsion thrust needs while providing the desired dry Mach 3.0-3.5 propulsion thrust levels by suitable scheduling of the airflow through the engine and turbine inlet temperature.

The specific introduction of the last-stage rear variable stator vanes in the compressor 30 permits tailoring of the compressor map flow-speed characteristic through the engine to limit operating physical speeds at Mach 3.0-3.5 to about the same levels of rotor speed at sea level static values. This allows a relatively high corrected speed to be used in the design of the compressor which in turn minimizes the number of stages and resulting cost of the high specific flow, low radius ratio compression system. Furthermore, the accompanying high physical rotary speed of the rotor 32 minimizes diameter of the high pressure turbine 34 for a given turbine aerodynamic loading, keeping the maximum envelope diameter of the engine as small as possible.

The afterburner 20 illustrated in FIG. 2 may have a conventional configuration derived from corresponding augmented aircraft engines but sized sufficiently small for the small missile application. The afterburner 20 may include a tubular combustion liner mounted concentrically inside a surrounding annular casing to define an annular bypass duct radially therebetween.

The inlet end of the afterburner liner receives the spent combustion gases 28 from the core engine, a portion of which may be diverted through the bypass duct for cooling the afterburner liner during operation.

A plurality of conventional fuel spraybars 42, with conventional V-gutter flameholders attached thereto, extend radially inwardly from the afterburner casing at the forward end of the afterburner liner. The fuel spraybars are operatively joined to the engine controller 24 for scheduling fuel flow to the spraybars of the afterburner during operation.

In this way, the engine controller 24 controls operation of both the main combustor 36 in the core engine and the afterburner combustor through the corresponding fuel injectors therefor, with the fuel being scheduled thereto in accordance with the subsonic, transonic, and supersonic flight requirements of the turbojet engine.

The exhaust nozzle 22 illustrated in FIG. 2 may also have any conventional configuration. The nozzle may include a plurality of articulated primary flaps defining a converging inlet duct 44. A plurality of articulated or pivotable secondary flaps are disposed downstream therefrom to define a diverging outlet duct 46. The inlet duct converges aft in flow area to a throat 48 of minimum flow area, and the outlet duct diverges aft therefrom for diffusing the combustion gases 28 discharged from the nozzle outlet during operation.

The primary and secondary flaps are operatively joined to a suitable drive train including linkages and one or more actuators for varying slope of the flaps in their converging and diverging inclines, while also varying flow area (typically designated A8) at the throat 48. The controller 24 is configured with suitable software for scheduling the desired flow area of the throat and the corresponding inclinations of the converging and diverging ducts 44,46 for cooperating with the core engine during operation.

For example, the controller 24 is specifically configured for adjusting the exhaust nozzle 22 for varying flow area of the throat 48 for minimum flow area during dry subsonic flight of the missile, and with maximum flow area during wet transonic flight of the missile, and with an intermediate flow area between the minimum and maximum flow areas during the dry or wet supersonic flight of the missile all of which require different mass flow rates of the compressed air and combustion gases channeled through the turbojet engine during operation.

Unlike a typical augmented aircraft engine in which the afterburner thereof must be operated full time during supersonic flight in excess of Mach 2, the afterburner 22 in the turbojet engine illustrated in FIG. 2 is operated wet solely or primarily in the transonic portion of the flight envelope, while being operated dry both in the slower subsonic portion and the faster supersonic portion of the flight envelope. Correspondingly, the rear variable stator vanes of the compressor 30 are coordinated with increasing flight speed, and with operation of the afterburner, to prevent excessive speed of the rotor 32 while still providing the maximum mass flow rate through the turbojet engine required for efficient propulsion thrust in the Mach 3.0-3.5 flight envelope.

The CD exhaust nozzle 22 illustrated in FIG. 2 may have any conventional configuration such as that found in military aircraft suitably sized for the substantially smaller application thereof in the supersonic missile. The nozzle may be circular in cross section or rectangular in accordance with conventional aircraft practice and should be simplified as much as possible for the disposable application of the turbojet engine in the missile.

Notwithstanding the substantial simplification of the missile turbojet design described above, the engine nevertheless requires various actuators, motors, and pumps for the efficient operation thereof. All of these devices, as well as the engine controller itself, require suitable power during the short, one way mission to the intended target.

In a conventional aircraft gas turbine engine, a mechanical power takeoff (PTO) system is typically driven by the low pressure rotor of a two spool turbofan engine to hydraulically power various components, as well as powering an electrical starter-generator.

The starter-generator is a conventional device which typically uses battery power for starting the engine, and then the engine powers the generator for producing electrical power as needed in operation of engine. The starter-generator is typically coupled in the engine using a reduction or step-up gearbox as required for the specific application, with the gearbox adding complexity, size, and weight to the installed engine.

Accordingly, an integral starter-generator 50 as shown in FIGS. 2 and 3 is preferentially located inside the core engine 18 and is sized and configured for providing all electrical power required for the engine itself, as well as the missile in which it is installed. The starter-generator, or simply generator, may be configured for replacing the conventional PTO system, and thereby eliminate the complexity thereof and reduce the size and weight of the generator for effecting all, or mostly all, electrical operation of the engine including the various components thereof requiring power. For example, the typical hydraulic actuators or shaft driven pumps may be replaced by electrical actuators and pumps powered by the generator 50 during operation.

As shown in FIG. 3, the generator 50 may be sized and configured for generating suitable electrical power to operate most, if not all, of the components of the engine and missile which require power. For example, the engine controller 24 and associated electrical control components may be powered by the generator. Various actuators and pumps in the engine and missile may be electrically driven by the generator. And the control or avionics components of the missile may also be electrically powered by the generator.

Figure 4:
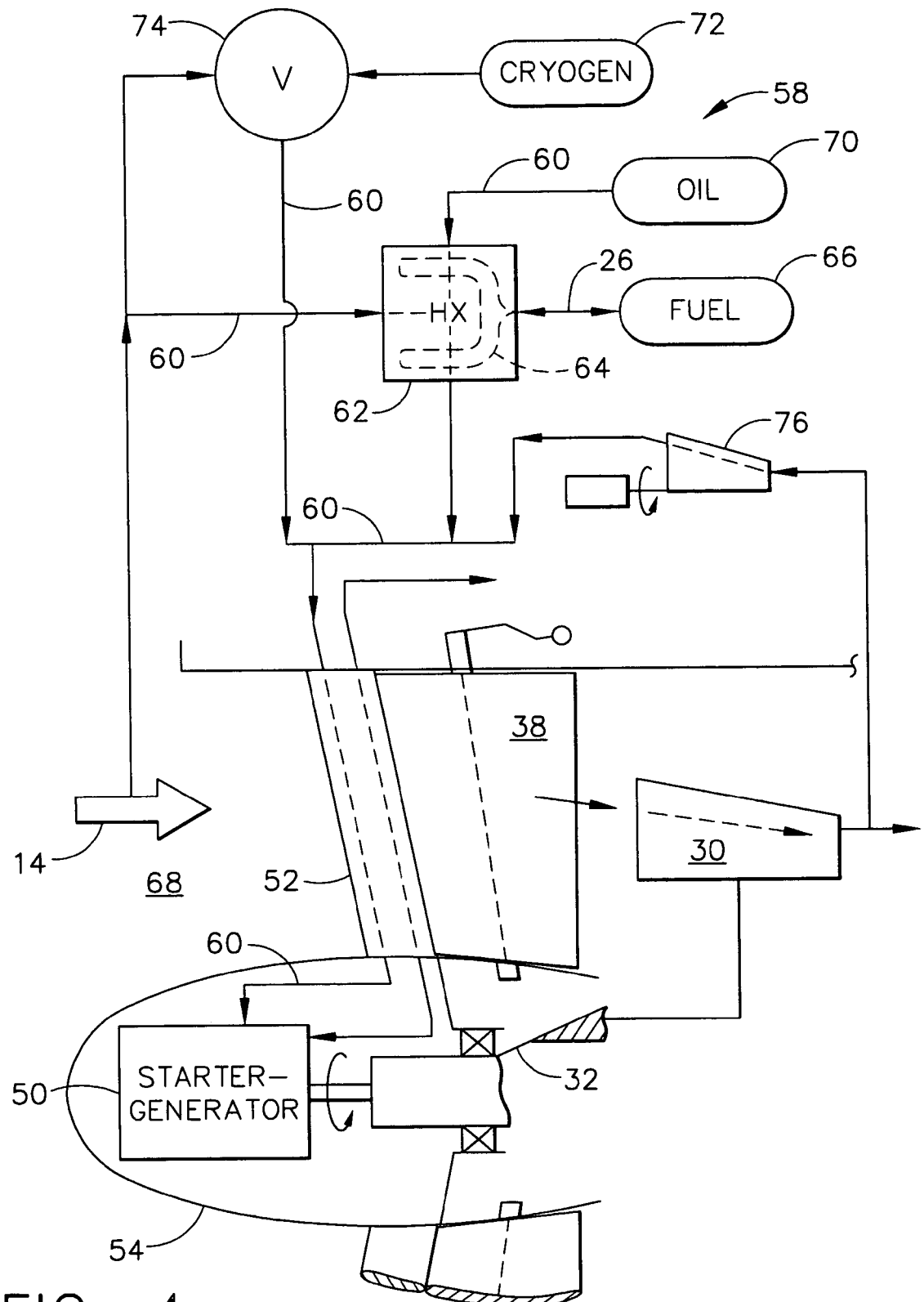
FIG. 4 is a schematic view of the integrated starter generator illustrated in FIG. 3 and various cooling configurations therefor.

As shown in FIGS. 3 and 4, the generator 50 is operatively joined to the single rotor 32 of the core engine for equal speed rotation therewith without the need for a PTO system, or a reduction gearbox, or a step-up gearbox as otherwise found in conventional aircraft engines. The electrical controller 24 may be operatively joined by electrical leads to the generator 50 for being powered thereby during the entire flight mission after the engine is started. The engine may be started from an auxiliary power supply such as a battery or other power source provided in the launching system therefor.

As indicated above, integral starter-generators themselves are conventional in configuration and operation and include a rotor and stator and corresponding electrical windings and permanent magnets as desired for producing electrical power when the rotor is driven inside the stator windings. For starter operation, the windings are powered for in turn rotating the generator rotor which in turn rotates the rotor of the engine during initial startup thereof.

However, the starter-generator 50 introduced in the core engine illustrated in FIGS. 3 and 4 is relatively small and compact and is configured for operation at the high rotational speed of the compressor rotor 32 which may typically reach about 30,000 rpm.

This high speed operation of the generator 50 permits a substantial increase in the electrical efficiency of the generator which correspondingly permits a substantial reduction in size of the generator. However, the generator must be suitably mounted inside the small envelope of the single rotor core engine for reducing the diameter thereof, but is then subject to substantial generation of heat therein, especially in view of the expected power requirements therefor approaching about 10 kw for an all electric missile engine application.

The core engine 18 illustrated in FIG. 3 includes a pair of forward and aft bearing frames 52 which support the rotor 32 at corresponding axially opposite forward and aft ends thereof. Such bearing frames include radially outer and inner rings between which extend corresponding radial struts. The struts in the forward frame are fixed and may be positioned at the leading edges of corresponding variable vanes 38 in a typical configuration. And, the struts in the aft frame may be aerodynamically streamlined, and may have a rotary position for deswirling the combustion gases discharged from the high pressure turbine.

Both forward and aft frames 52 further include integral inner supports joined to the inner rings thereof in which corresponding bearings are mounted. The bearings in turn support the opposite axial ends of the common rotor 32 during operation.

As shown in FIG. 3, the generator 50 is joined coaxially to the rotor 32 inside either the forward frame or the aft frame where space permits and the input heat load thereto is limited. Either end of the rotor 32 is therefore available for direct connection to the generator 50.

The core engine 18 typically includes an aerodynamic fairing in the form of a nose cone 54 in front of the forward frame and tail cone 56 extending aft from the aft frame to provide correspondingly smooth inlets and outlets of the core engine for efficiently receiving the ram air and discharging the exhaust gases, respectively.

The generator 50 is preferably directly coupled to the corresponding end of the rotor 32 without a speed changing gearbox therebetween in a compact and small envelope inside either the nose cone 54 illustrated in solid line in FIG. 3, or in the tail cone 56 illustrated in phantom line in FIG. 3.

As best shown in FIG. 4, the generator 50 includes a suitable drive shaft suitably joined to the forward end of the rotor 32 using a typical spline coupling for example. The drive shaft of the generator 50 is integral with the rotor therein and is driven in a one-to-one direct equal speed correspondence with the engine rotor 32. The generator will therefore be driven at the high physical rotary speed of the engine rotor 32 itself.

Since no gearbox is required for joining the generator to the engine rotor, the size of the generator itself may be maximized within the limited space of the nose cone 54 in the exemplary embodiment illustrated in FIG. 4. Notwithstanding the small size of the generator 50 its high speed rotation during engine operation permits a substantial amount of electrical power generation therefrom, on the order of about 10 kw, which correspondingly will generate a substantial amount of heat during operation.

Although the intended flight mission for the missile is relatively short, the substantial heat generated in the generator 50 during operation, and its hidden location inside the nose cone 54, require suitable cooling thereof for preventing premature heat failure thereof prior to completion of the flight mission.

FIG. 3 illustrates schematically means in the form of a cooling system 58 disposed outside the core engine within the available space of the missile itself for providing suitable cooling of the generator 50 hidden inside the core engine within the nose cone 54. The cooling system 58 includes a dedicated generator cooling circuit 60 in the form of one or more tubes or conduits extending through the struts of the corresponding frame 52 from outside the core engine to inside the core engine to reach the generator 50. The cooling circuit 60 will typically surround the generator itself in multiple coils for effectively removing heat therefrom during operation and limit the operating temperature of the generator within an acceptable maximum temperature of operation.

In the exemplary embodiment illustrated in FIG. 4, the generator 50 is disposed inside the nose cone 54 radially inside the forward frame 52 for providing an axially straight and unobstructed line-of-sight inlet flowpath into the compressor 30. The nose cone 54 begins the radially inner boundary of the airflow path, with the outer boundary thereof being defined by the outer casing. The nose cone is located radially inside the frame struts, and maximizes the inlet flow area to the compressor, while correspondingly minimizing the available space inside the nose cone for mounting the starter-generator therein.

However, the generator 50 and the nose cone 54 are located in most, if not all, part axially inside the inlet end of the core engine, with little if any axial projection upstream therefrom. The inlet ram air 14 is then efficiently drawn into the core engine without obstruction from the nose cone or the hidden generator.

Alternatively, the generator 50 may be similarly mounted inside the tail cone 56 as illustrated in phantom line in FIG. 3. The generator 50 would then be disposed radially inside the aft frame 52 for providing an axially unobstructed outlet flowpath from the core engine into the afterburner. The tail cone 56 converges in the downstream direction which permits the exhaust flowpath to diverge and diffuse the exhaust flow into the inlet end of the afterburner.

Since the turbine end of the core engine is typically larger in diameter than the inlet end of the engine, the tail cone 56 typically provides more available space for mounting the generator therein if desired. However, the tail cone portion of the engine is exposed to the hot combustion gases which further increases the cooling requirements for the generator during operation.

FIG. 4 illustrates schematically various embodiments of the cooling system 58 which may be used for suitably cooling the starter-generator 50 in various embodiments of the missile and expected flight range. Generator cooling is a challenge since the missile is specifically configured for operating at supersonic flight speeds including the high Mach 3.0-3.5 range.

At this high flight speed, the inlet ram air 14 is considerably hot, and may approach several hundred degrees Celsius. Such ram air itself is inadequate for cooling the generator at supersonic operation of the missile. Furthermore, the ram air is pressurized in the compressor 30 which further increases its temperature and further renders unusable such hot pressurized air for cooling the generator.

Accordingly, the engine illustrated in FIG. 4 may include a conventional heat exchanger (HX) 62 in which a portion of the generator cooling circuit 60 forms a primary circuit therein, and a secondary circuit 64 is joined in flow communication with the fuel supply 66 of the engine. The fuel initially stored in the missile is relatively cool and therefore may be channeled through one circuit of the heat exchanger for suitably cooling a suitable fluid in the other circuit of the heat exchanger for in turn cooling the generator during operation.

As initially illustrated in FIG. 1, the missile includes a suitable air inlet or intake 68 having an inlet in the side thereof and extending through a duct to the inlet end of the core engine. As shown in FIG. 4, the generator cooling circuit 60 may be joined in flow communication with the engine intake 68 for channeling some of the inlet ram air 14 firstly through the heat exchanger wherein it is cooled and then to the generator 50 for cooling thereof.

In another embodiment, the generator cooling circuit 60 may instead be channeled through the heat exchanger 62 to the oil supply 70 of the engine for channeling oil through the heat exchanger for cooling thereof, with the cooled oil then being channeled to the generator 50 for cooling thereof.

FIG. 4 illustrates yet another embodiment of the cooling system 58 in which a suitable cryogen, such as liquid air or liquid nitrogen, is stored in a suitable cryogen supply tank 72 on board the missile. A mixing or metering valve 74 is joined in flow communication with the cryogen tank 72, the cooling system 60, and the engine intake 68. The valve 74 is controlled by the engine controller for mixing the cryogen with the inlet ram air for cooling the air which is then channeled through the cooling circuit for cooling the generator 50.

Alternatively, the cryogen may not be mixed with the ram air, but may be directly circulated around the generator 50 for cooling thereof.

FIG. 4 illustrates yet another embodiment for the cooling system 58 which includes a turbocooler 76 having an inlet joined in flow communication with the discharge end of the compressor 30 for receiving compressor discharge pressure air therefrom. The outlet end of the turbocooler is joined to the cooling circuit 60.

The turbocooler is a small turbine powered by the compressor discharge air for turning the rotor of the turbocooler to provide mechanical shaft power for operating any desired component in the engine such as actuators, pumps, or generators with the limited power available from the turbocooler.

The pressurized air channeled through the turbocooler is expanded and correspondingly reduces temperature thereof, with the cooler, expanded air then being channeled through the cooling circuit 60 for cooling the generator 50.

The various forms of the cooling systems disclosed above will typically be used alone, and are selected for their specific cooling capabilities and ability to be conveniently integrated into the missile system in the available space therefor outside the engine itself.

The single rotor design of the turbojet engine 12 permits a substantial reduction in complexity thereof when compared with typical dual spool turbine engines used for powering aircraft. Integration of the starter generator directly inside the core engine without the need for a connecting gearbox further reduces the size, weight, and complexity of the engine system. Considerable electrical power may be generated in the starter generator during operation, with the generator being suitably cooled by auxiliary components outside the engine as described above for maintaining performance thereof for the limited duration of the flight mission.

As shown in FIGS. 1 and 2, the turbojet engine 12 is integrated or mounted inside the aft end of the missile 10 in a corresponding tubular engine bay 78 provided therefor. The turbojet engine 12 illustrated in FIG. 1 further includes the inlet air duct or intake 68 extending forward from the core engine in axial alignment therewith, with the intake extending forwardly through the side of the missile body or casing for receiving ambient ram air during subsonic to supersonic operation.

The external portion of the intake 68 should be suitably configured for efficiently receiving ambient air 14 under ram pressure as the missile is operated from subsonic through supersonic operation. In supersonic operation, shock waves will be generated in the entrance to the intake for channeling subsonic inlet air into the core engine.

The resulting afterburning turbojet engine disclosed above is relatively small and compact and can lead to a low cost, effective propulsion solution for a volume limited, dimensionally constrained missile propulsion system. The turbojet engine results in minimum engine size while providing balanced thrust production at key transonic and supersonic flight conditions. The integrated starter generator may be configured to provide all required electrical power in the missile in a compact configuration hidden inside the engine and with suitable cooling for the flight mission. And, the relative simplicity of the afterburning turbojet engine will correspondingly reduce the production cost thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A supersonic turbojet engine comprising:
   a core engine including a multistage axial compressor joined by a rotor to a high pressure turbine, with an annular combustor disposed therebetween, a nose cone disposed at a forward end of said rotor, and a tail cone disposed at an aft end of said rotor;
   an afterburner disposed coaxially with an aft end of said core engine for receiving combustion gases therefrom;
   a converging-diverging exhaust nozzle disposed coaxially with an aft end of said afterburner for discharging said combustion gases;
   an integral starter generator disposed inside said nose cone and operatively joined to said forward end of said rotor for equal speed rotation therewith; and
   an electrical controller operatively joined to said generator for being powered thereby.

2. An engine according to claim 1 wherein:
   said core engine further includes a pair of forward and aft frames supporting said rotor at said forward and aft ends thereof, respectively; and
   said generator is joined coaxially to said rotor inside said forward frame.

3. An engine according to claim 2 further comprising a cooling system disposed outside said core engine, and including a cooling circuit extending through said forward frame to said generator for cooling thereof inside said core engine.

4. An engine according to claim 3 wherein said generator is directly coupled to said rotor without a speed changing gearbox therebetween in a compact envelope inside said nose cone.

5. An engine according to claim 4 wherein said generator is disposed radially inside said forward frame for providing an axially unobstructed inlet flowpath into said compressor.

6. An engine according to claim 5 wherein said cooling system further comprises a heat exchanger including said generator cooling circuit, and a secondary circuit 64 joined to a fuel supply for channeling fuel through said heat exchanger to cool said cooling circuit.

7. An engine according to claim 6 wherein said cooling circuit is joined to an intake for channeling ram air to cool said generator.

8. An engine according to claim 5 wherein said cooling system further comprises:
   a cryogen stored in a tank; and
   a mixing valve joined to said cryogen tank, said cooling circuit, and an intake of said core engine for mixing said cryogen with ram air to supply cooled air to said generator for cooling thereof.

9. An engine according to claim 5 wherein said cooling system further comprises a turbocooler joined in flow communication with said compressor for receiving compressor discharge air therefrom, and joined to said cooling circuit for channeling expanded air from said turbocooler for cooling said generator.

10. An engine according to claim 5 wherein said controller is configured for scheduling fuel to said combustor and afterburner for operating said afterburner dry during subsonic flight of said engine in a missile, wet during transonic flight, and dry during supersonic flight.

11. A turbojet engine for powering a supersonic missile comprising:
    a core engine including a multistage axial compressor joined by a rotor to a high pressure turbine, with an annular combustor disposed therebetween;
    an afterburner disposed coaxially with an aft end of said core engine for receiving combustion gases therefrom;
    a converging-diverging exhaust nozzle disposed coaxially with an aft end of said afterburner for discharging said combustion gases;
    an integral starter generator disposed inside said core engine and operatively joined to said rotor for equal speed rotation therewith; and
    an electrical controller operatively joined to said generator for being powered thereby.

12. An engine according to claim 11 wherein:
    said core engine further includes a pair of forward and aft frames supporting said rotor at corresponding axially opposite forward and aft ends; and
    said generator is joined coaxially to said rotor radially inside one of said frames.

13. An engine according to claim 12 further comprising a cooling system disposed outside said core engine, and including a cooling circuit extending through said one frame to said generator for cooling thereof inside said core engine.

14. An engine according to claim 13 wherein:
    said core engine further includes a nose cone at said forward frame and a tail cone at said aft frame; and
    said generator is directly coupled to said rotor without a speed changing gearbox therebetween in a compact envelope inside one of said cones.

15. An engine according to claim 14 wherein said generator is disposed inside said nose cone and radially inside said forward frame for providing an axially unobstructed inlet flowpath into said compressor.

16. An engine according to claim 14 wherein said generator is disposed inside said tail cone, and radially inside said aft frame for providing an axially unobstructed outlet flowpath from said core engine into said afterburner.

17. An engine according to claim 14 wherein said cooling system further comprises a heat exchanger including said generator cooling circuit, and a secondary circuit joined to a fuel supply for channeling fuel through said heat exchanger to cool said cooling circuit.

18. An engine according to claim 17 wherein said cooling circuit is joined to an intake for channeling ram air to cool said generator.

19. An engine according to claim 17 wherein said generator cooling circuit is joined to an oil supply for channeling oil to cool said generator.

20. An engine according to claim 14 wherein said cooling system further comprises:
    a cryogen stored in a tank; and
    a mixing valve joined to said cryogen tank, said cooling circuit, and an intake of said core engine for mixing said cryogen with ram air to supply cooled air to said generator for cooling thereof.

21. An engine according to claim 14 wherein said cooling system further comprises a turbocooler joined in flow communication with said compressor for receiving compressor discharge air therefrom, and joined to said cooling circuit for channeling expanded air from said turbocooler for cooling said generator.

22. An engine according to claim 14 in combination with said supersonic missile and mounted inside an engine bay at an aft end thereof, and said turbojet engine further includes an intake extending forward from said core engine and forwardly through the side of said missile for receiving ambient air during subsonic to supersonic operation.

* * * * *